Oct. 10, 1967   F. V. BROSSEIT   3,345,901
BLIND RIVET ASSEMBLY
Filed Oct. 19, 1965
FIG.-1
FIG.-2
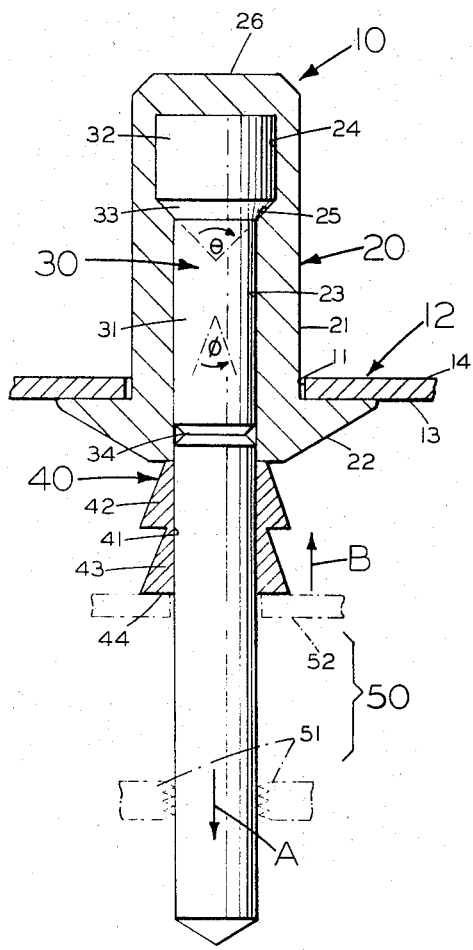
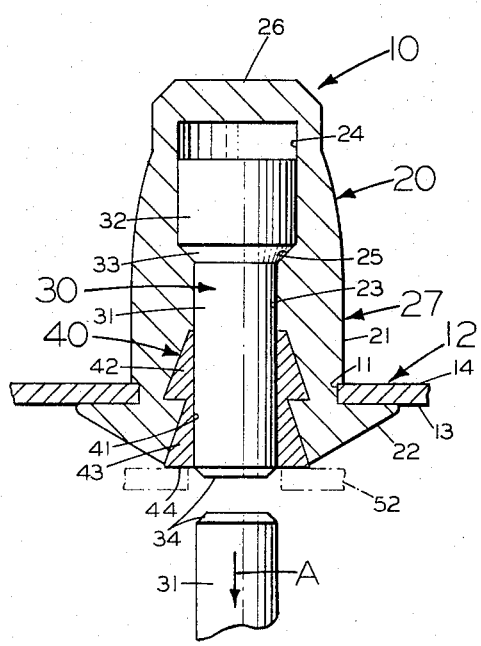
INVENTOR
F.V. BROSSEIT
By J.L. Landis
ATTORNEY United States Patent Office 3,345,901
Patented Oct. 10, 1967

3,345,901
BLIND RIVET ASSEMBLY
Fritz V. Brosseit, Kansas City, Mo., assignor to Western Electric Company, Incorporated, New York, N.Y. a corporation of New York
Filed Oct. 19, 1965, Ser. No. 497,939
5 Claims. (Cl. 85—77)

ABSTRACT OF THE DISCLOSURE

A blind rivet assembly includes a hollow rivet of ductile material which is expanded outward into sealing engagement with the walls of an apertured workpiece. The outward expansion is produced by simultaneously moving a clinching mandrel having an enlarged portion, which engages a shoulder formed within the hollow rivet, and a tapered plug which is slidably received on the mandrel.

---

This invention relates generally to blind rivet assemblies of the type which can be applied and set from the same side of a workpiece, and has for its principal object the provision of improved blind rivet assemblies which are simple and compact, but which are capable of forming extremely tight seals with the workpiece.

With the foregoing and other objects in view, a blind rivet assembly in accordance wtih the invention includes three main elements, (a) a hollow headed rivet of ductile material having a tubular barrel which is inserted into an aperture in a workpiece, (b) a clinching mandrel which is pulled to cause bulbing of the barrel to form a second head on the rivet abutting an interior surface of the workpiece, and (c) a tapered plug which is forced into the rivet from the head end to expand the material of the rivet outward into sealing engagement with the walls of the aperture in the workpiece. The general construction and operation of the rivet and mandrel are conventional in the art, the present invention relating to the combination of those elements with the tapered plug, in which the expansion caused by the plug cooperates with the bulbing caused by the mandrel to form an extremely tight seal.

More particularly, in accordance with certain features of the invention, the rivet is of such size that the barrel may be inserted into the aperture in the workpiece with the head abutting an exterior surface of the workpiece. The clinching mandrel includes a shaft with an enlarged portion at one end, which is received within the rivet barrel near the unheaded end. The shaft extends through an axial bore in the rivet to a position beyond the rivet head where it can be gripped and pulled away from the rivet head. The barrel is formed with a shoulder which is engaged by the enlarged portion of the mandrel as the mandrel is pulled to compress the barrel of the rivet and force it to bulb outward and thus form the second head on the rivet abutting the interior surface of the workpiece. The plug is formed with an axial bore permitting slidable reception of the plug on the mandrel shaft in engagement with the exterior surface of the rivet head. The exterior dimensions of the plug are such that it can be forced into the rivet bore from the head end as the mandrel is pulled. The plug is formed with an outwardly taperled exterior portion which forces the material of the rivet to expand outward into sealing engagement with the walls of the aperture in the workpiece as the plug is forced into the rivet.

Preferably, the plug consists of two identical fructoconical sections, one immediately following the other, both of which are designed to be forced into the rivet to a position where the large-diameter end of the inner section is located opposite to the aperture in the workpiece and the large-diameter end of the outer section is flush with the exterior surface of the rivet head. Also, the mandrel is preferably formed with a conically tapered shoulder which engages a conically tapered passage in the barrel as the mandrel is pulled to compress and expand the barrel.

Other objects, advantages and features of the invention will be apparent from the following detailed description of a specific embodiment thereof, when taken in conjunction with the appended drawings.

FIGS. 1 and 2 are cross-sectional views illustrating a rivet assembly and a portion of the workpiece, before and after setting of the rivet.

General arrangement

Referring now in detail to the drawings, and particularly to FIG. 1, a rivet assembly 10 in accordance with a preferred embodiment of the invention is illustrated for sealing an aperture 11 in a workpiece 12. In a specific example, the workpiece 12 consists of a thin metal base of a high-vacuum electron tube (at least as low as $1 \times 10^{-6}$ millimeters of mercury), in which it is desired to form a vacuum-tight seal in the aperture 11. However, it should be understood that the rivet assembly 10 may be used for various applications where it is desired to seal an aperture in a workpiece, such as in joining together two metal sheets or plates as is common in riveting operations. In general, blind rivets are especially useful when one side of the work is inaccessible, as these rivets can be applied and set from the accessible side of the workpiece. In the drawings, the exterior surface of the workpiece 12 is designated by the numeral 13 and the interior or "blind" surface by the numeral 14.

The three major elements of the rivet assembly 10 include a hollow rivet 20, a clinching mandrel 30, and a tapered plug 40. The operative portions of a conventional setting tool are illustrated in phantom lines and are designated collectively by the numeral 50.

Construction and assembly

The rivet 20 is formed of a ductile material such as copper, and includes a tubular barrel 21 having an enlarged head 22 at one end. As is generally conventional in blind rivet assemblies, the barrel has an outer dimension slightly smaller than the aperture 11 so that the barrel may be inserted into the aperture, as illustrated in FIG. 1, with the head abutting the exterior surface 13 of the workpiece 12. In the specific example, as in most applications, the aperture 11 is circular and the barrel 21 accordingly is cylindrical and is of such length that it projects well into the interior of the workpiece, as illustrated in FIG. 1.

The clinching mandrel 30 is formed of a hard material such as steel, and includes a shaft 31 with an enlarged portion 32 at one end. The shaft 31 is slidably received within an axial bore 23 formed in the rivet and extending through the head 22. The shaft 31 is sufficiently long that it extends through the bore 23 to a position beyond the rivet head 22, as illustrated, where it can be gripped by a pair of jaws 51—51, forming a part of the setting tool 50, and thereby pulled away from the rivet head 22. Preferably, the mandrel shaft 31 is cylindrical, as is the bore 23, and the shaft may be formed with a serrated portion adjacent to the jaws 51—51 to facilitate the gripping and pulling operations.

In the specific embodiment, the enlarged portion 32 of the mandrel is a cylindrical section, and the mandrel is formed with a conically tapered shoulder 33 joining the enlarged portion 32 with the mandrel shaft 31. The enlarged portion 32 is initially received within a cylindrical counterbore 24 formed in the rivet barrel 21 near the unheaded, or "inner" end thereof. The shoulder 33 is received in a conically tapered passage 25 connecting the counterbore 24 with the bore 23, the walls of which act as a shoulder which is engaged by the enlarged portion of the mandrel as the mandrel is pulled. For optimum results, the slopes of the tapered shoulder 33 and the passage 25 are equal to each other, preferably having an apex angle θ of approximately 90°. The inner end of the barrel 21 is closed by a solid end wall 26, as is preferable for vacuum or pressure sealing applications; however, open ended blind rivet constructions are also commonly used in the art for many applications.

The plug 40 is also formed of a hard material such as steel, and is provided with an axial cylindrical bore 41 of a diameter permitting close slidable reception of the plug 40 on the mandrel shaft 31. In the preferred embodiment, the plug consists of two identical frustoconical sections 42 and 43, one immediately following the other. Initially, the plug is placed on the shaft 31 with the small-diameter end of the inner section 42 in engagement with the exterior surface of the rivet head 22, as illustrated in FIG. 1.

*Operation*

In order to apply the rivet assembly, the rivet 20, the clinching mandrel 30, and the plug 40 are assembled in the aperture 11 as illustrated in FIG. 1, and the mandrel shaft 31 is then gripped by the jaws 51—51 of the setting tool 50. At the same time, an anvil 52 of the setting tool 50 is placed firmly against the outer end 44 of the plug 40. in order to set the rivet, the jaws 51—51 are moved away from the rivet assembly 10 to pull the mandrel shaft 31 away from the rivet head 22 (arrow A), while simultaneously the anvil 52 forces the plug 40 into the rivet bore 23 (arrow B) to a set position shown in FIG. 2, where the outer end 44 of the plug 40 is flush with the exterior surface of the rivet head 22. If desired, the outer end (FIG. 1) of the bore 23 may be flared slightly to facilitate entry of the plug 40.

As the mandrel 30 is pulled, the conically tapered shoulder 33 of the mandrel engages the shoulder defined by the walls of the conically tapered passage 25, thus compressing the rivet barrel 21 and forcing it to bulb outward, to the configuration illustrated in FIG. 2, forming a second head 27 on the rivet abutting and sealing the interior surface 14 of the workpiece 12. At the same time, the tapered sections 42 and 43 of the plug 40 force the material of the rivet 20, within the head 22 and in the portion of the barrel 21 adjacent to the head, to expand outward into sealing engagement with the walls of the aperture 11 in the workpiece 12. The expansion caused by the plug 40 cooperates with the bulbing action caused by the mandrel 30 to form an extremely tight seal between the rivet and the workpiece.

Preferably, the dimensions of the plug 40 are set so that the large-diameter end of the inner section 42 is located opposite to the aperture 11 when the plug has been fully forced into the rivet, as illustrated in FIG. 2. As is customary with certain types of blind rivets, the clinching mandrel 30 is formed with a neck 34 of reduced diameter, which is designed to fracture upon the application of further pulling force by the jaws 51—51 after the seal has been made. Preferably, the neck 34 is located at a point such that the broken end of the mandrel 30 is approximately flush with the outer surface 44 of the plug 40 after the sealing operation, as indicated in FIG. 2. This construction is known as a "solid-core" rivet, as distinguished from a "hollow-core" type where the mandrel breaks at the junction between the enlarged portion 32 and the shaft 31. Either construction may be utilized in accordance with the invention, although the solid-core type is preferred for vacuum or pressure sealing applications.

While the double frustoconical plug illustrated constitutes a preferred embodiment of the invention, the essential feature of the invention is that the plug have an outwardly tapered exterior portion, and have exterior dimensions such that the plug can be forced into the rivet bore 23 to expand the material of the rivet into sealing engagement with the walls of the aperture 11. A single tapered section similar to the section 42 could be used for some applications, depending primarily on the thickness of the rivet head 22, and it would be feasible to interpose straight cylindrical sections before and/or after the tapered section or sections for specific applications. Preferably, the apex angle φ of the frustoconical plug sections 42 and 43 is between 30° and 45° for optimum sealing, being approximately 40° in the embodiment illustrated.

While one specific embodiment of the invention has been described in detail hereinabove, it will be obvious that various modifications may be made from the specific details described without departing from the spirit and scope of the invention.

What is claimed is:

1. A blind rivet assembly, comprising:
    (a) a hollow rivet of ductile material including a tubular barrel with a head at one end, the rivet having an axial bore extending through the head and being of such size that the barrel may be inserted into an aperture in a workpiece with the head abutting an exterior surface of the workpiece said bore having an enlarged section to provide a shoulder;
    (b) a clinching mandrel including a shaft with an enlarged portion at one end, the enlarged portion being received within the rivet barrel near the unheaded end and engaging said shoulder, and the shaft extending through the bore to a position beyond the rivet head where it can be gripped and pulled away from the rivet head, to compress the barrel and force it to bulb outward and form a second head on the rivet abutting the interior surface of the workpiece; and
    (c) an axially bored plug slidably received on the mandrel shaft in engagement with the exterior surface of the rivet head, the exterior dimensions of the plug being such that it can be forced into the rivet bore from the head end as the mandrel is pulled, the plug having an outwardly tapered exterior portion which forces the material of the rivet to expand outward into sealing engagement with the walls of the aperture in the workpiece as the plug is forced into the rivet, the expansion caused by the plug cooperating with the bulbing caused by the mandrel to form a tight seal between the rivet and the workpiece.

2. A blind rivet assembly as recited in claim 1, wherein the tapered portion of the plug consists of a frustoconical section initially arranged with the small-diameter end engaging the exterior surface of the rivet head.

3. A blind rivet assembly as recited in claim 2, wherein the plug consists of two identical frustoconical sections, one immediately following the other, which are designed to be forced into the rivet to a position where the large-diameter end of the inner section is located opposite to the aperture in the workpiece and locks the plug within the rivet.

4. A blind rivet assembly as recited in claim 3, wherein the apex angle of the frustoconical sections is between 30° and 45°.

5. A blind rivet assembly, comprising:
    (a) a hollow rivet of ductile material including a tubular cylindrical barrel with a head at one end and being closed at the other end, the rivet being of such size that the barrel may be inserted into an aperture in a workpiece with the head abutting an exterior surface of the workpiece, the barrel having an axial cylindrical bore extending through the head, a cylindrical counterbore at the closed end, and a conically tapered passage connecting the counterbore with the bore;
    (b) a clinching mandrel including a cylindrical shaft with an enlarged cylindrical section at one end and a conically tapered shoulder joining the enlarged section to the shaft, the enlarged section being received within the counterbore in the rivet barrel and the shaft extending through the bore to a position beyond the rivet head where it can be gripped and pulled away from the rivet head, the tapered shoulder of the mandrel engaging the walls of the tapered passage in the barrel as the mandrel is pulled to compress the barrel and force it to bulb outward and form a second head on the rivet abutting the interior surface of the workpiece; and (c) a plug consisting of two identical frustoconical sections, one immediately following the other, the plug having an axial cylindrical bore and being slidably received on the mandrel shaft with the small-diameter end of an inner one of the sections in engagement with the exterior surface of the rivet head, the diameter and taper of the plug sections being such that the plug can be forced into the rivet bore from the head end as the mandrel is pulled to a position where the large-diameter end of the inner section is located opposite to the aperture in the workpiece, and the large-diameter end of the outer section is flush with the exterior surface of the rivet head, the material of the rivet expanding outward into sealing engagement with the walls of the aperture in the workpiece as the plug is forced into the rivet, the expansion caused by the plug cooperating with the bulbing caused by the mandrel to form a tight seal between the rivet and the workpiece.

References Cited

UNITED STATES PATENTS

| | | | |
|---|---|---|---|
| Re. 24,363 | 10/1957 | Curtis | 85—77 |
| 877,118 | 1/1908 | Peirce | 85—70 |
| 1,695,303 | 12/1928 | Tomkinson | 85—70 |
| 2,021,176 | 11/1935 | Curtis | 85—70 |
| 2,298,203 | 10/1942 | Eklund | 85—74 |
| 3,091,990 | 6/1963 | McVittie | 85—67 |
| 3,107,572 | 10/1963 | Orloff | 85—70 |

FOREIGN PATENTS

| | | |
|---|---|---|
| 885,268 | 5/1943 | France. |
| 1,069,718 | 2/1954 | France. |

CARL W. TOMLIN, *Primary Examiner.*

M. PARSONS, JR., *Assistant Examiner.*